(12) United States Patent
Kopty et al.

(10) Patent No.: US 11,788,683 B2
(45) Date of Patent: Oct. 17, 2023

(54) PROTECTING APPARATUS FOR APPLIANCE SUPPORTED BY TRIPOD

(71) Applicant: SICHER PROTECTION LTD, Naharyia (IL)

(72) Inventors: Elias Kopty, Naharyia (IL); Elias Khoury, Nazereth (IL)

(73) Assignee: SICHER PROTECTION LTD., Naharyia (IL)

( * ) Notice: Subject to any disclaimer, the term of this patent is extended or adjusted under 35 U.S.C. 154(b) by 0 days.

(21) Appl. No.: 17/299,301

(22) PCT Filed: Dec. 1, 2019

(86) PCT No.: PCT/IL2019/051316
§ 371 (c)(1),
(2) Date: Jun. 2, 2021

(87) PCT Pub. No.: WO2020/115736
PCT Pub. Date: Jun. 11, 2020

(65) Prior Publication Data
US 2021/0372562 A1 Dec. 2, 2021

Related U.S. Application Data

(60) Provisional application No. 62/774,341, filed on Dec. 3, 2018.

(51) Int. Cl.
*F16P 7/00* (2006.01)
*G01C 15/00* (2006.01)
*F16F 9/04* (2006.01)

(52) U.S. Cl.
CPC .................. *F16P 7/00* (2013.01); *F16F 9/04* (2013.01); *G01C 15/008* (2013.01)

(58) Field of Classification Search
CPC ...... F16F 9/00; F16F 2222/00; F16F 2228/00; F16F 2238/00; F16F 5/00; F16F 9/04;
(Continued)

(56) References Cited

U.S. PATENT DOCUMENTS 2,282,285 A    5/1942  Olson
7,059,182 B1*  6/2006  Ragner ................. H04M 1/185
                                            73/200

(Continued)

FOREIGN PATENT DOCUMENTS

CN    108194805 B    6/2018
CN    207848863 U    9/2018
(Continued)

OTHER PUBLICATIONS

KR 10182947 B1 English translation (Year: 2018).*
(Continued)

*Primary Examiner* — Robert A. Siconolfi
*Assistant Examiner* — Mahbubur Rashid
(74) *Attorney, Agent, or Firm* — The Roy Gross Law Firm, LLC; Roy Gross

(57) ABSTRACT

A protection apparatus for an appliance supported by a tripod, the protection apparatus including: a tilt sensor, for alerting upon tilting of the tripod; and an airbag inflated upon the alerting for protecting the appliance. The airbag is shaped to comprise at least one of three protrusions, projected outward upon airbag inflation, each protrusion being directed in one of the common tilting directions perpendicular to and towards an imaginary line between feet of two tripod legs.

11 Claims, 6 Drawing Sheets

(58) Field of Classification Search
CPC ........ F16P 7/00; F05B 2210/00; G01C 15/00; G01C 15/008
See application file for complete search history.

(56) References Cited

U.S. PATENT DOCUMENTS

| | | | | |
|---|---|---|---|---|
| 8,330,305 | B2* | 12/2012 | Hart ...................... | H04M 1/185 |
| | | | | 361/679.02 |
| 9,612,622 | B2* | 4/2017 | Moon ...................... | H02H 6/00 |
| 10,715,645 | B2* | 7/2020 | Wilson .................. | G06F 1/1694 |
| 2014/0005577 | A1* | 1/2014 | Goffer .................. | A61H 1/0262 |
| | | | | 601/34 |

FOREIGN PATENT DOCUMENTS

| | | |
|---|---|---|
| CN | 108843717 A | 11/2018 |
| KR | 101474718 B1 | 12/2014 |
| KR | 101829047 B1 * | 2/2018 |
| KR | 20180034161 A1 * | 4/2018 |
| KR | 101869873 B1 * | 6/2018 |
| KR | 101892472 B1 * | 8/2018 |

OTHER PUBLICATIONS

KR 20180034161 A1 English translation (Year: 2018).*
PCT Search Report for International Application No. PCT/IL2019/051316 dated Jun. 29, 2020, 3 pp.
PCT Written Opinion for International Application No. PCT/IL2019/051316 dated Jun. 29, 2020, 5 pp.
PCT Preliminary Report ON Patentability for International Application No. PCT/IL2019/051316 completed Dec. 1, 2020, 2020, 12 pp.
European Search Report for 19891709.8 dated Jan. 5, 2022 11 pages.

* cited by examiner

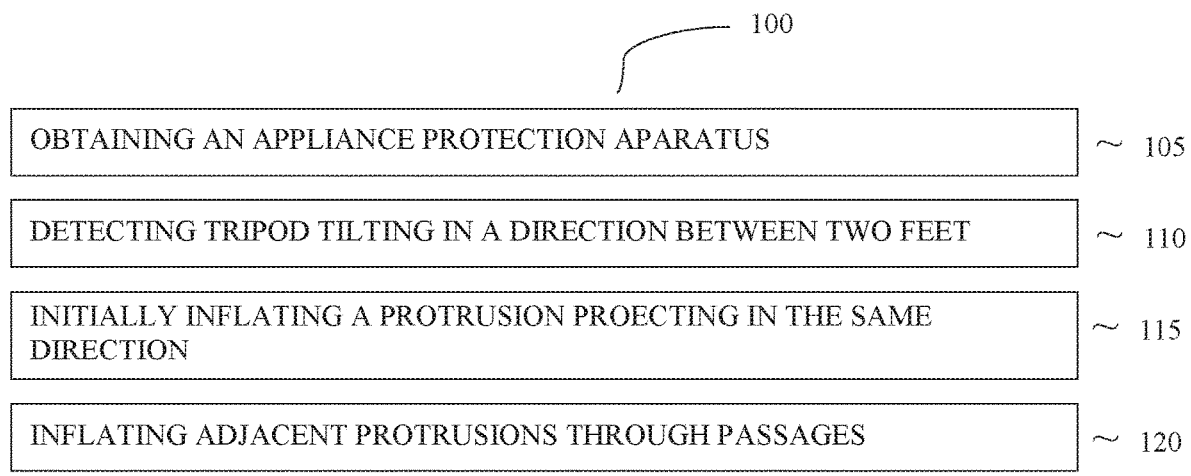

PROTECTING APPARATUS FOR APPLIANCE SUPPORTED BY TRIPOD

This application is a National Phase of PCT Patent Application No. PCT/IL2019/051316 having International filing date of Dec. 1, 2019, which claims the benefit of priority of U.S. Provisional Patent Application No. 62/774,341, filed Dec. 3, 2018, the contents of which are all incorporated herein by reference in their entirety.

TECHNICAL FIELD

The invention relates to the field of tripods. More particularly, the invention relates to a method and apparatus for protecting appliances supported thereby.

BACKGROUND

Precision surveying and optical instruments, such as a theodolite, are very expensive but critical tools for professional surveyors. They are generally mounted on a tripod that are often light-weight in order to be easily carried between surveyed sites.

One problem with such an arrangement is the ease of toppling of the tripod and consequent damage or destruction of the expensive instrument mounted thereon. The smallest kick or brushing alongside the mounted instrument, or even wind, is enough to topple the arrangement and crash the instrument, causing untold expense and loss of work for the surveyor.

Several protection schemes involving the use of a protective airbag to inflate and prevent damage to the instrument are previously disclosed.

CN 2078488630 discloses a fall-protection tripod, with a built-in airbag to support a subassembly when the tripod falls down. When the tripod strikes the ground, a sensor produces an immediate response, and a signal is transmitted to a gas-generator control unit. The control unit instantly fills an airbag with gas. An expanded gasbag is through a guide plate direction, and then wrapped around measuring instrument circumference. The measuring instrument is prevented from falling to the ground.

Embodiments of the present invention advance the state of the art in equipment protection for tripods, as further described below.

SUMMARY

The present invention relates to a protection apparatus, for an appliance supported by a tripod, the protection apparatus comprising
  one or more tilt sensors, configured to issue a tilting signal upon tilting of the tripod; and
  an airbag, inflated upon issuing of the tilting signal; wherein
  the airbag projects in one or more protrusions when inflated; and
  each the protrusion projects in a projected direction substantially perpendicular to and towards an imaginary line between two feet of the tripod.

In another embodiment, the airbag comprises three segments, each segment inflatable to one of the protrusions.

In another embodiment, the airbag further comprises tubes; each tube in fluid connection with one of the segments, for directly inflating a protrusion from any one of the segments.

In another embodiment, a direction of the tilting is in a direction substantially in one of the projected directions and the directly inflated segment is the one inflated to a protrusion projecting in the tilting direction, thereby enabling cushioning of a fall to the ground of the appliance due to the tilting.

In another embodiment, the airbag further comprises one or more passages establishing fluid communication between adjacent pairs of the segments, thereby enabling subsequent inflation of the segments that are adjacent to the directly inflated protrusion, thereby protecting the appliance from rolling on the ground after the fall.

In another embodiment, the airbag is not inflated if the tilting is in a direction substantially parallel with and towards a leg of the tripod.

In another embodiment, the airbag is not inflated if the tilting direction is in any direction other than in one of the directions substantially perpendicular to and towards an imaginary line between two feet of the tripod.

Another embodiment of the invention relates to a protection apparatus for an appliance supported by a tripod, the protection apparatus comprising:
  one or more tilt sensors, configured to issue a tilting signal; and
  an airbag, inflated upon issuing of the tilting signal;
  wherein the tilt sensor(s) issue the tilting signal upon detecting a tilting direction substantially perpendicular to and towards an imaginary line between two feet of the tripod.

Another embodiment comprises three tilt sensors, each configured to detect one axis of tilting, each disposed so as to enable detection of the tilting in one of the tilting directions.

In another embodiment, the three tilt sensors are each disposed between two legs of the tripod.

In another embodiment, the airbag comprises three segments, each the segment inflatable to a protrusion projecting in one of the tilting directions.

In another embodiment, the airbag comprises tubes; each tube in fluid connection with one of the segments, for directly inflating a protrusion from any one of the segments.

In another embodiment, the initially inflated segment is the one projecting in the tilting direction.

In another embodiment, the airbag is not inflated if the tilting is in a direction substantially parallel with and towards a leg of the tripod.

In another embodiment, the airbag is not inflated if the tilting direction is in any direction other than in one of the directions substantially perpendicular to and towards an imaginary line between two feet of the tripod.

Another embodiment of the invention relates to a method for protecting an appliance supported by a tripod, the method comprising steps of
  obtaining the above protection apparatus, in any of its
  detecting a tilting of the tripod in a direction perpendicular to and towards an imaginary line between two feet of the tripod;
  initially inflating a protrusion of an airbag of the apparatus, the initially inflated protrusion projecting in the tilting direction; and
  inflating protrusions of the airbag adjacent to the initially inflated protrusion, through passages between the initially inflated protrusions and the adjacent protrusions.

BRIEF DESCRIPTION OF THE DRAWINGS

Embodiments, features, and aspects of the invention are described herein in conjunction with the following drawings:

FIG. 5 shows steps of a method for protecting an appliance supported by a tripod, according to some embodiments of the invention.

The figures are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

Reference numbers have been used to point out elements in the embodiments described and illustrated herein, in order to facilitate the understanding of the invention. The illustrated embodiments are meant to be exemplary, and not limiting. Also, embodiments of the invention are described and illustrated in conjunction with systems and methods thereof, which are meant to be merely illustrative, and not limiting.

Figure 1:
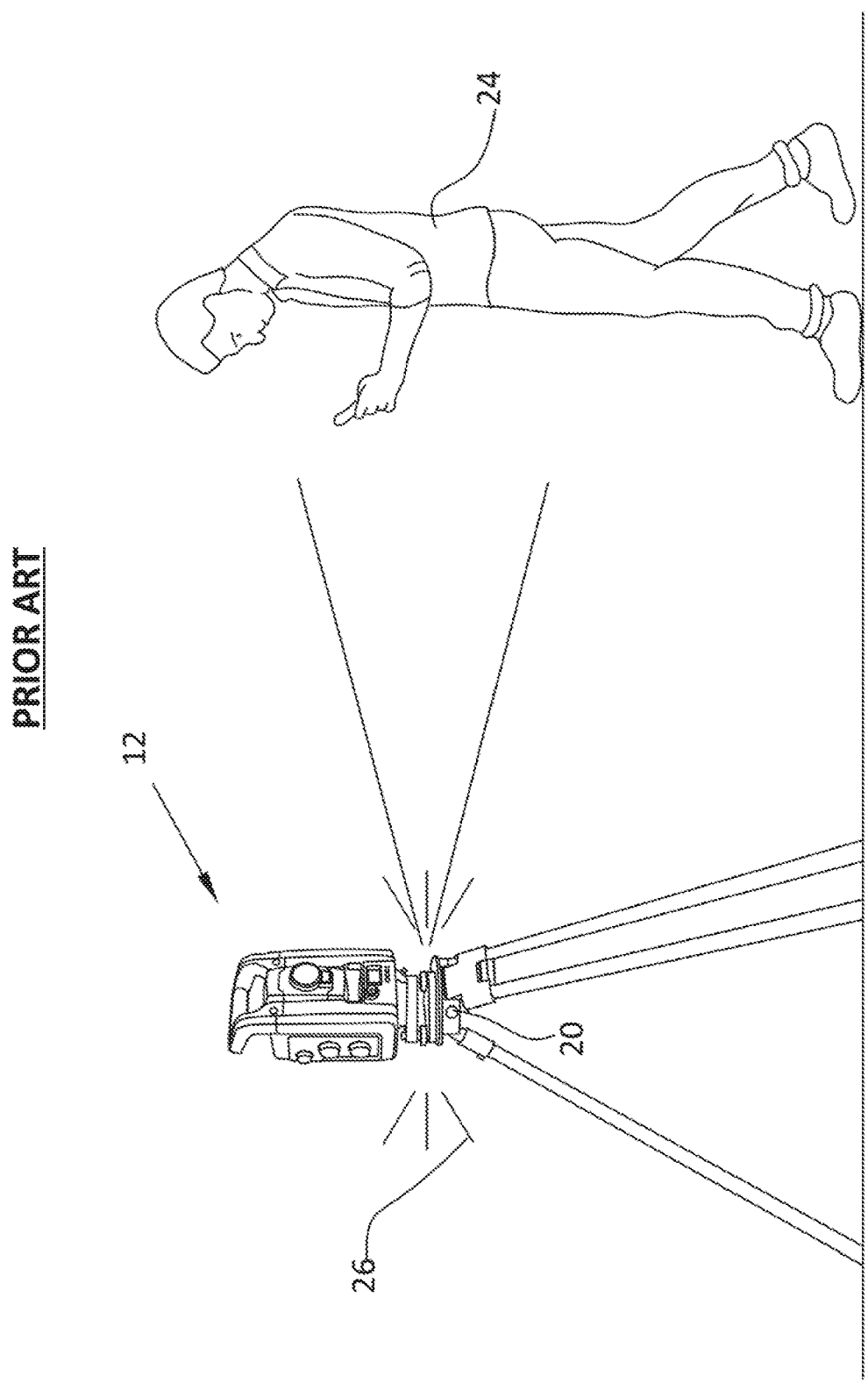
FIG. 1 shows an appliance supported by a tripod, according to prior art.

FIG. 1 depicts a prior art appliance being supported by a tripod.

An appliance 12, such as a measuring appliance or a camera, being supported by a tripod 50, is subject to falls induced by knocking 26 by persons 24, typically unaware of an impending accident. Appliance 12 is not protected from the tripod 50 tilting and tipping over, whereby appliance 12 crashes against the ground.

Figure 2A:
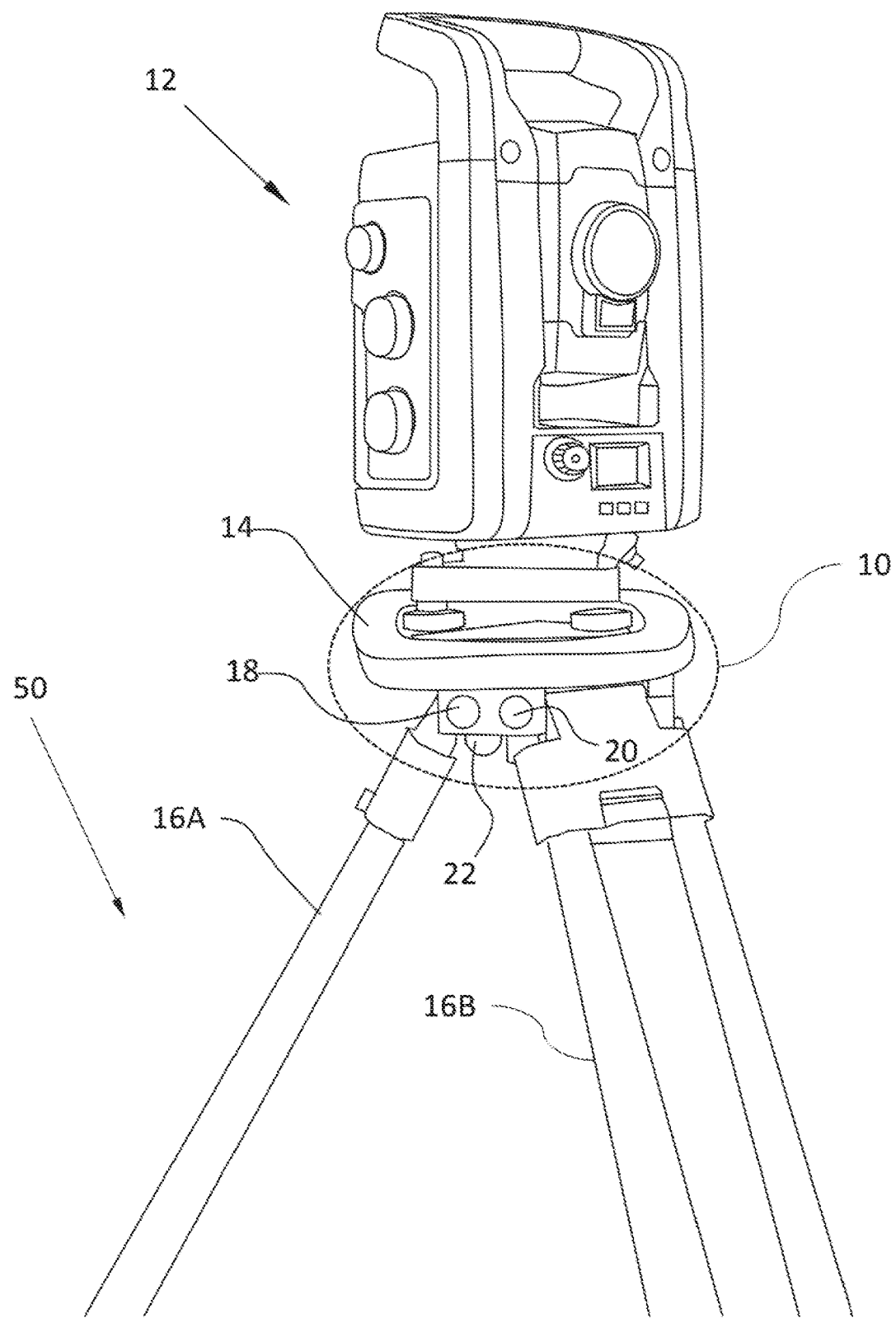
FIG. 2A shows an appliance supported by a tripod, with an apparatus for protecting the appliance, according to some embodiments of the invention.

FIG. 2A depicts an appliance 12 mounted on a tripod 50, together with an apparatus 10 for protecting appliance 12.

Figure 2B:
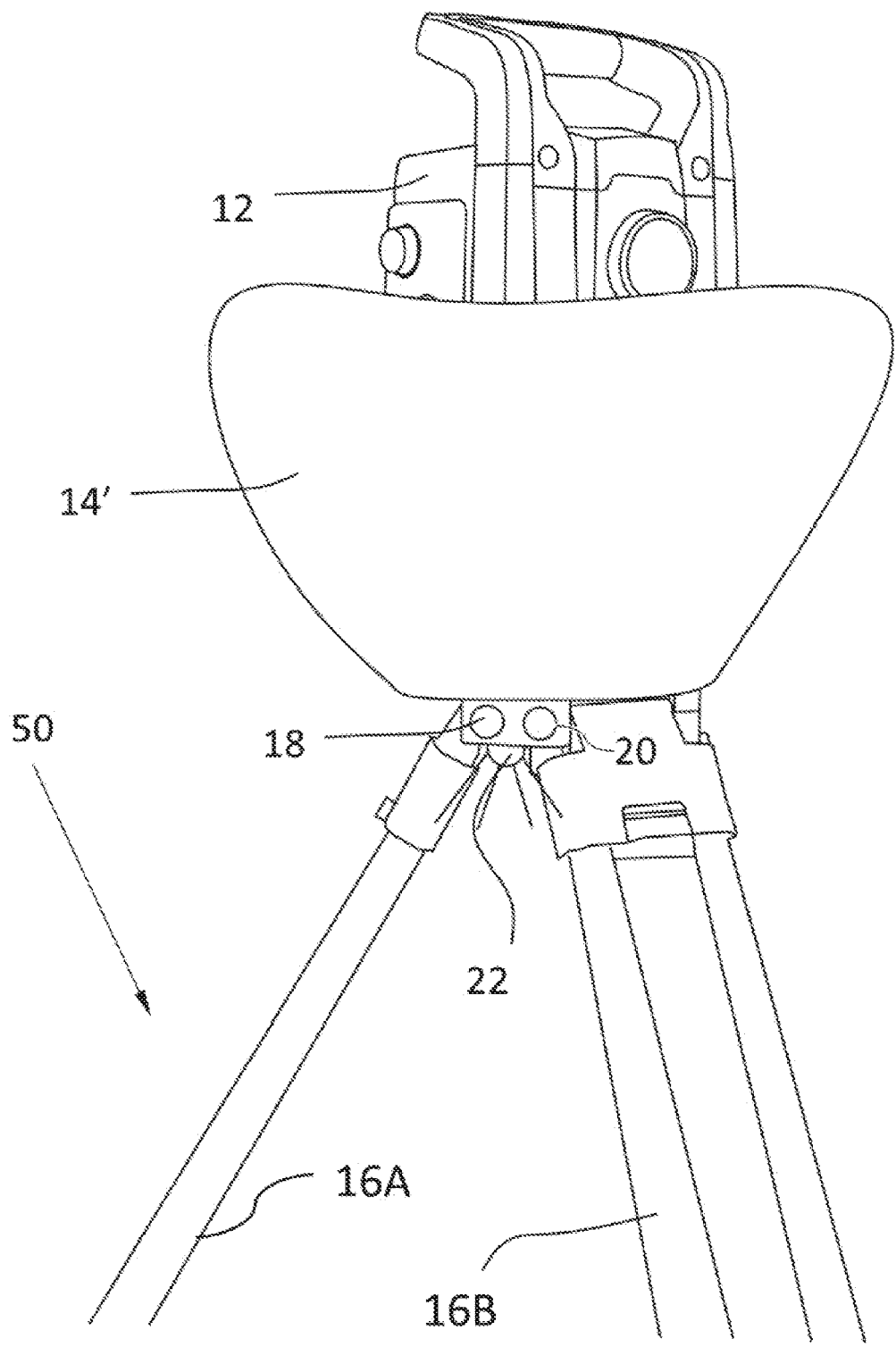
FIG. 2B shows the appliance and tripod enwrapped with an airbag after a fall, according to some embodiments of the invention.

Protection apparatus 10 comprises one or more tilt sensors 18, such as accelerometers, for sensing tilting of tripod 50; and at least one airbag 14. Tilt sensors 18 are mounted on tripod 50, in rigid connection with tripod 50. Upon tilt sensor 18 detecting a predetermined tilt (magnitude and/or direction) of tripod 50, airbag 14 is deployed to protect appliance 12. Apparatus 12 with a deployed airbag 14' is shown in FIG. 2B.

It is understood that the term "airbag," as used throughout the disclosure, can refer not only to a type of airbag similar to a vehicle safety airbag, but may also refer to any inflatable (e.g., a balloon). Additionally, airbag 14 may be composed of any suitable material, including rubber, fabric, silicone, synthetics, and combinations thereof. Additionally, airbag 14 may be single use or may be reusable.

Optionally, one or more body motion sensors 20 may detect a person nearby. Optionally, a speaker 22 may issue an audible alert to a nearby person detected by body motion sensor 20. Optionally, speaker 22 may issue an audible danger signal to alert a person after tilt sensor 18 detects tilting of tripod 50, to prompt the person to try to grasp the tripod 50 before it tips over.

Figure 3A:
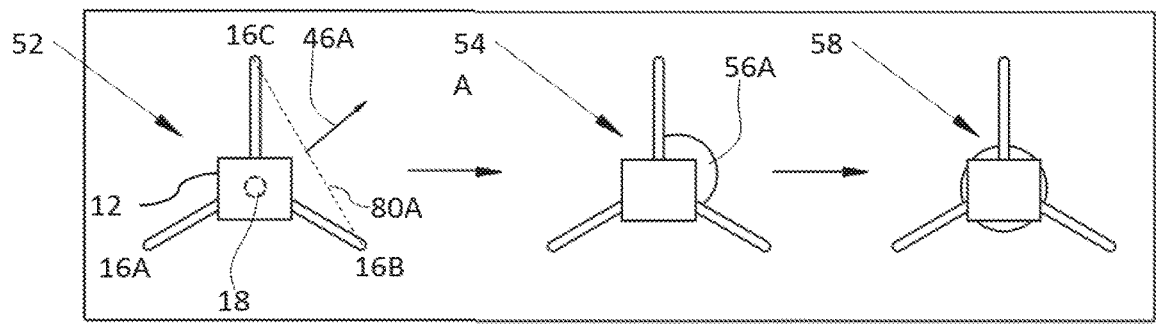
FIG. 3 is a top view of the appliance and tripod with the protection apparatus of FIGS. 2A-2B, during various steps of protection, according to some embodiments of the invention.
Figure 3B:
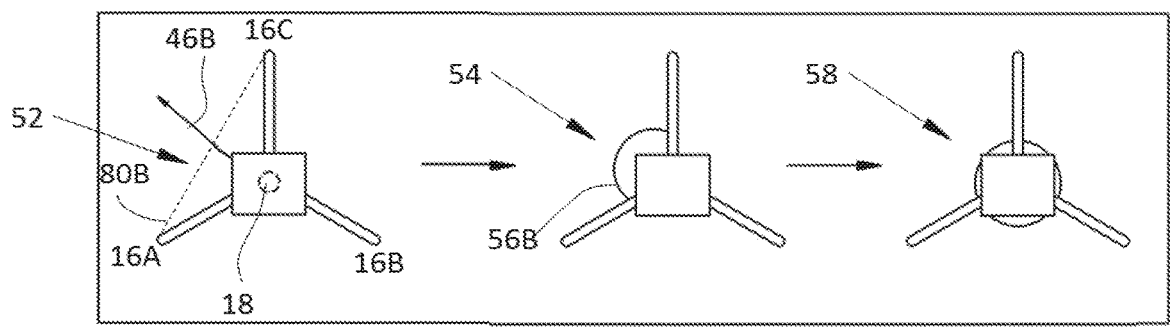
Figure 3C:
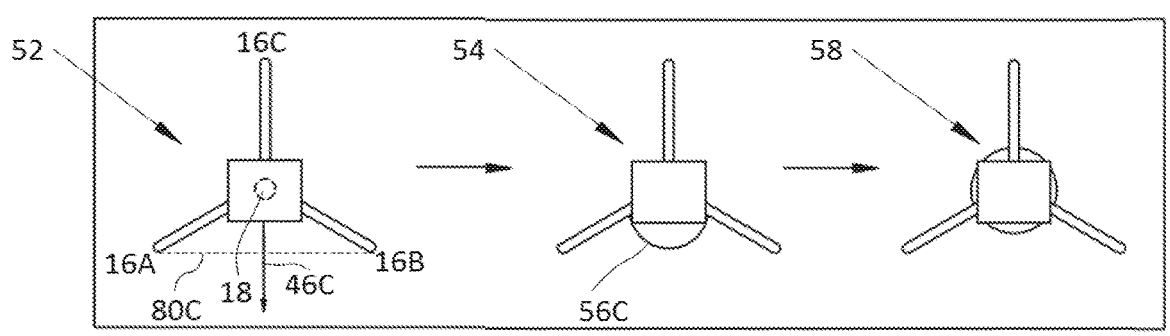

FIGS. 3A-3C are top views of the appliance 12, tripod 50, and protection apparatus 10 of FIG. 2 during three stages: an upright stage 52, an initial stage of protection 54, and a later stage of protection 58.

While upright 52, appliance 12 is apt to be accidentally tilted along two legs of tripod 50 when tripod 50 is bumped; that is, appliance 12 is tilted in one of three directions; in direction 46A, perpendicular to and towards an imaginary line 80A from the foot of leg 16B to the foot of leg 16C; in direction 46B, perpendicular to and towards an imaginary line 80B from the foot of leg 16A to the foot of leg 16C; or in direction 46C, perpendicular to and towards an imaginary line 80C from the foot of leg 16A to foot 16B.

When tilt sensor 18 detects tilt in one of the three directions 46A, 46B, or 46C (within an angular tolerance of the tilt direction and at a threshold angle of tilt), one of three airbag protrusions-56A, 56B, or 56C—projecting in direction 46A, 46B, or 46C, respectively is directly inflated, before appliance 12 reaches the ground, during the initial protection stage 54. Initial protection stage 54 provides protection to appliance 12 in the direction of tipping of tripod 50, cushioning the impact of appliance 12 falling to the ground.

In some embodiments, a single tilt sensor 18 detects the magnitude and direction of tripod tilt. Alternatively, (or additionally) one or more tilt sensors 18 are each sensitive to a single tilt axis (e.g., tilt from rear to fore but not tilt from right to left), by design, calibration, or programming of tilt sensors 18. Tilt sensors 18 are each disposed between pairs of legs of tripod 50. Tilt sensors 18 between a pair of legs are disposed so as to detect the one of three directions of tilt perpendicular to the pair of legs—i.e., directions 46A, 46B, or 46C. Three such tilt sensors 18 may be positioned between each of the three pairs of legs to each detect one of the three tilt directions 46A, 46B, and 46C and to trigger initial deployment of airbag protrusion 56A, 56B, or 56C, respectively.

In some embodiments, during later protection stage 58, all three protrusions 56A, 56B, and 56C of airbag(s) 14 are inflated, fully surrounding appliance 12. Fully surrounding airbag(s) 14 can help to protect all sides of appliance 12 from damage caused by appliance 12 rolling on the floor after the initial impact.

Figure 3D:
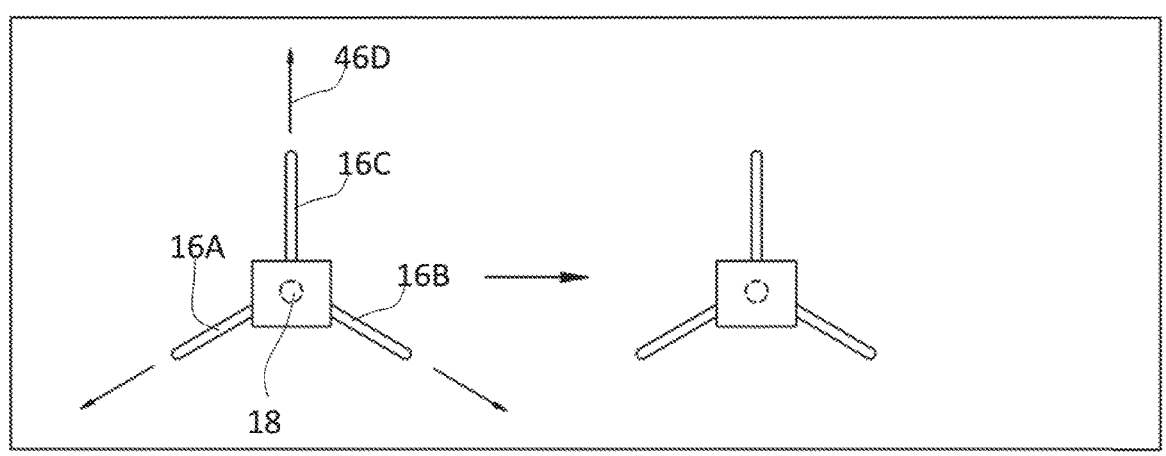

In some embodiments, airbag(s) 14 will not be deployed (i.e., none of protrusions 56A, 56B, and 56C will inflate) if tilt sensor 18 detects tilt of tripod 50 in one or more directions other than directions 46A, 46B, and 46C. For example, in FIG. 3D tripod 50 tilts in a direction 46D parallel to and towards one of the legs 16C. In this case, airbag(s) 14 will not be inflated, helping to prevent unnecessary deployments and replacements of single-use airbags 14. In some embodiments, airbag(s) 14 will not be inflated in any direction other than 46A, 46B, and 46C.

Figure 4:
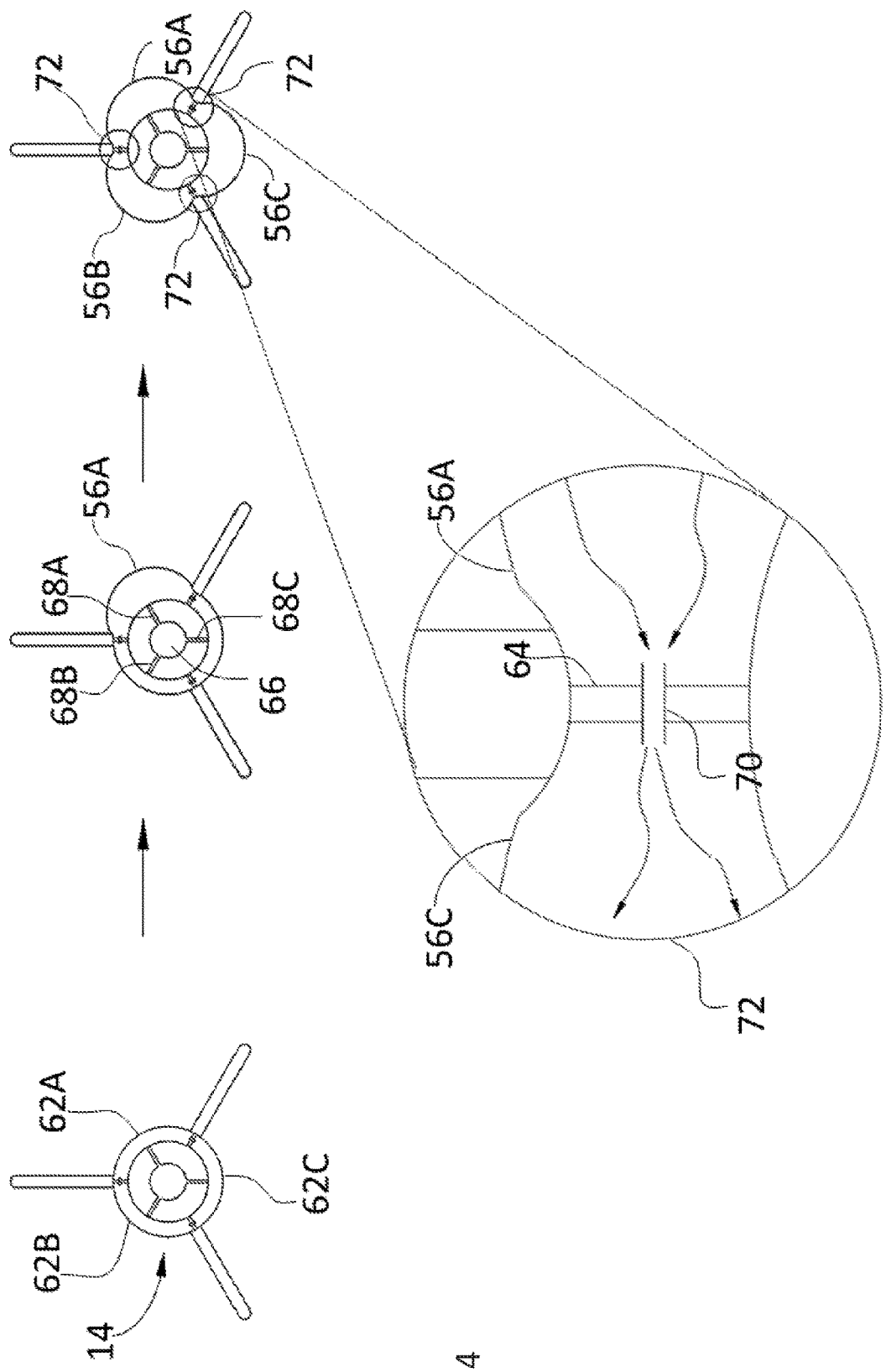
FIG. 4 is a top view of the tripod and the protection apparatus of FIG. 3, showing details of the airbag according to some embodiments of the invention.

FIG. 4 shows a top view of tripod 50 and apparatus 10, cut to show an airbag 14 and tripod 50, according to some embodiments.

Airbag 14 comprises three segments, 621, 62B, and 62C. Each segment is directly inflatable by a tube 68A, 68B, or 68C from a gas canister 66 (or a controlled explosion device). In this example, tilt sensor 18 detects tilting in direction 46A (see FIG. 3A). Apparatus 10 is configured to select inflation of segment; 62A of airbag 14, through corresponding tube 68A. Gas through tube 68A directly inflates segment 62A, resulting in inflated protrusion 56A.

In some embodiments, there are partitions 72 between adjacent pairs of segments 62A, 62B, and 62C. Each partition 72 comprises a seal 64. Seals 64 prevent gas that enters segment 62A (in the example shown in FIG. 4) from suddenly filling segments 62B and 62C.

However, in some embodiments, passages 70 provide openings through seals 64, allowing gas that entered into projection 56A from canister 66 to subsequently fill segments 62B and 62C. In the later protection stage 58, all three segments are inflated, thereby achieving desired protection from damage by rolling of appliance 12 after a fall.

FIG. 5 shows steps of a method 100 for protecting an appliance supported by a tripod; the method 100 comprises steps of:
- obtaining a protection apparatus for an appliance supported by a tripod 105;
- detecting a tilting of the tripod in a direction perpendicular to and towards an imaginary line between two feet of the tripod 110;
- initially inflating a protrusion of an airbag of the apparatus, the initially inflated protrusion projecting in the tilting direction 115; and
- inflating protrusions of the airbag adjacent to the initially inflated protrusion, through passages between the initially inflated protrusions and the adjacent protrusions 120.

Table 1 lists reference numbers used in the figures and descriptions of the referenced features.

TABLE 1

| Reference No. | Description |
| --- | --- |
| 10 | Protection apparatus |
| 12 | Protected appliance |
| 14 | Airbag(s) |
| 16A, 16B, 16C | Legs of tripod |
| 18 | Tilt sensor(s) |
| 20 | Body motion sensor(s) |
| 22 | Alerting speaker |
| 24 | Person |
| 26 | Knock |
| 46A, 46B, 46C | Tilt direction causing tipping and falling of the tripod |
| 56A, 56B, 56C | Airbag protrusions |
| 50 | Tripod |
| 64 | Seals between airbag segments |
| 66 | Gas canister |
| 68A, 68B, 68C | Tubes |
| 70 | Passages between airbag segments |
| 72A, 72B, 72C | Partitions between airbag segments |
| 80A, 80B, 80C | Imaginary lines between feet of tripod legs |

The foregoing description and illustrations of the embodiments of the invention have been presented for the purpose of illustration, and are not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

The invention claimed is:

1. A protection apparatus (10) for an appliance (12) supported by a tripod (50); said protection apparatus (10) comprising:
one or more tilt sensors (18), configured to issue a tilting signal upon tilting of said tripod (50);
an airbag (14), inflated upon issuing of said tilting signal; said airbag (14) comprising one or more segment, each of said one or more segments projecting into a protrusion when inflated; and each of said protrusions projecting in a projected direction substantially perpendicular to and towards an imaginary line between two feet of said tripod (50);
a direction of said tilting being in a direction substantially in one of said projected directions, a directly inflated segment is that one of said plurality of segments projecting in said tilting direction, thereby enabling cushioning of a fall to the ground of said appliance due to said tilting; and
one or more passages establishing fluid communication between adjacent pairs of said segments, said adjacent pairs of said segments comprising either a directly-inflated segment and a subsequently-inflated segment or two subsequently-inflated segments, thereby enabling subsequent inflation of said subsequently-inflated segments, thereby protecting said appliance during rolling on the ground after said fall.

2. The protection apparatus according to claim 1, wherein said airbag is not inflated if said tilting is in a direction substantially parallel with and towards a leg of said tripod.

3. The protection apparatus according to claim 2, wherein said airbag is not inflated if said tilting direction is in any direction other than in one of said directions substantially perpendicular to and towards said imaginary line between two feet of said tripod.

4. The protection apparatus according to claim 1, wherein said one or more tilt sensors (18) is configured for:
a. detecting a tilting of the tripod in a direction perpendicular to and towards said imaginary line between two feet of the tripod (110);
b. initially inflating said protrusion of said airbag of the apparatus, said initially inflated protrusion projecting in the tilting direction (115); and inflating protrusions of the airbag adjacent to the initially inflated protrusion, through passages between the initially inflated protrusions and the adjacent protrusions (120).

5. A protection apparatus (10) for an appliance (12) supported by a tripod (50); said apparatus (10) comprising:
one or more tilt sensors (18), configured to issue a tilting signal; and
an airbag (14), inflated upon issuing of said tilting signal, said airbag (14) projects in one or more protrusions when inflated; and each of said protrusions projects in a projected direction substantially perpendicular to and towards an imaginary line between two feet of said tripod (50), said airbag comprises three segments, each of said segments inflatable to a protrusion projecting in one of said tilting directions;
wherein said tilt sensor(s) issue said tilting signal upon detecting a tilting direction substantially perpendicular to and towards said imaginary line between two feet of said tripod (50).

6. The protection apparatus according to claim 5, comprising three said tilt sensors, each configured to detect one axis of said tilting, each disposed so as to enable detection of said tilting in one of said tilting directions.

7. The protection apparatus of claim 6, wherein said three tilt sensors are each disposed between two legs of said tripod.

8. The protection apparatus according to claim 5, wherein said airbag comprises tubes; each of said tubes in fluid connection with one of said segments, for directly inflating said protrusion from any one of said segments.

9. The protection apparatus according to claim 8, wherein an initially inflated segment is the one projecting in said tilting direction.

10. The protection apparatus according to claim 5, wherein said airbag is not inflated if said tilting is in a direction substantially parallel with and towards a leg of said tripod.

11. The protection apparatus according to claim 10, wherein said airbag is not inflated if said tilting direction is in any direction other than in one of said directions substantially perpendicular to and towards said imaginary line between two feet of said tripod.

\* \* \* \* \*